(12) United States Patent
Hu et al.

(10) Patent No.: US 12,499,627 B2
(45) Date of Patent: Dec. 16, 2025

(54) DATA PRESENTATION METHOD AND TERMINAL DEVICE

(71) Applicant: Huawei Technologies Co., Ltd., Shenzhen (CN)

(72) Inventors: Yue Hu, Wuhan (CN); Zhe Sun, Shenzhen (CN); Kan Zeng, Beijing (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 17/704,709

(22) Filed: Mar. 25, 2022

(65) Prior Publication Data

US 2022/0215639 A1 Jul. 7, 2022

Related U.S. Application Data

(63) Continuation of application No. PCT/CN2020/110135, filed on Aug. 20, 2020.

(30) Foreign Application Priority Data

Sep. 25, 2019 (CN) .......................... 201910916213.1

(51) Int. Cl.
*G06T 19/00* (2011.01)
*B60K 35/00* (2024.01)
(Continued)

(52) U.S. Cl.
CPC ............ *G06T 19/006* (2013.01); *B60K 35/10* (2024.01); *B60K 35/215* (2024.01); *B60K 35/23* (2024.01);
(Continued)

(58) Field of Classification Search
None
See application file for complete search history.

(56) References Cited

U.S. PATENT DOCUMENTS

2012/0323487 A1* 12/2012 Sempuku ............... G09B 29/10
701/428
2014/0067187 A1 3/2014 Ferguson et al.
(Continued)

FOREIGN PATENT DOCUMENTS

CN 107194957 A 9/2017
CN 108169730 A 6/2018
(Continued)

*Primary Examiner* — Jason Holloway
*Assistant Examiner* — Atticus A Cameron
(74) *Attorney, Agent, or Firm* — Conley Rose, P.C.

(57) ABSTRACT

A data presentation method applied to the field of autonomous driving technologies includes: obtaining traveling information of an autonomous driving apparatus and/or requirement information of a user for data presentation; determining, based on the traveling information of the autonomous driving apparatus and/or the requirement information of the user for data presentation, first point cloud data related to the autonomous driving apparatus; and determining a presentation manner of the first point cloud data, where the first point cloud data is data represented in a form of a plurality of points; and presenting the first point cloud data in the presentation manner. In embodiments of this application, the point cloud data related to the autonomous driving apparatus can be adaptively presented based on the traveling information and/or the user requirement information, and not all data needs to be presented.

20 Claims, 10 Drawing Sheets

(51) Int. Cl.
  *B60K 35/10* (2024.01)
  *B60K 35/215* (2024.01)
  *B60K 35/23* (2024.01)
  *B60K 35/28* (2024.01)
  *B60K 35/50* (2024.01)
  *B60K 35/85* (2024.01)
  *B60W 50/00* (2006.01)
  *B60W 50/14* (2020.01)

(52) U.S. Cl.
  CPC .............. *B60K 35/50* (2024.01); *B60K 35/85* (2024.01); *B60W 50/14* (2013.01); *B60K 35/28* (2024.01); *B60K 2360/161* (2024.01); *B60K 2360/166* (2024.01); *B60K 2360/167* (2024.01); *B60K 2360/177* (2024.01); *B60K 2360/178* (2024.01); *B60W 2050/0052* (2013.01); *B60W 2050/146* (2013.01); *B60W 2520/10* (2013.01); *B60W 2555/20* (2020.02); *B60W 2556/45* (2020.02)

(56) References Cited

U.S. PATENT DOCUMENTS

| | | | |
|---|---|---|---|
| 2014/0156187 A1* | 6/2014 | Goddard | G01C 21/3673 |
| | | | 701/533 |
| 2016/0234475 A1* | 8/2016 | Courchesne | H04N 7/157 |
| 2017/0089710 A1 | 3/2017 | Slusar | |
| 2018/0301029 A1* | 10/2018 | Nilsson | G06V 20/58 |
| 2019/0018413 A1 | 1/2019 | Wood et al. | |
| 2019/0156507 A1 | 5/2019 | Zeng | |
| 2019/0180714 A1 | 6/2019 | Komeichi et al. | |
| 2019/0189006 A1 | 6/2019 | Toma et al. | |
| 2019/0323843 A1 | 10/2019 | Yu et al. | |
| 2020/0090352 A1* | 3/2020 | Murashkin | G05D 1/0248 |
| 2020/0130678 A1* | 4/2020 | Gotoda | G01S 17/04 |
| 2020/0148112 A1* | 5/2020 | Itoh | G06F 1/163 |
| 2021/0300259 A1* | 9/2021 | Shibata | B60R 1/12 |
| 2021/0304499 A1 | 9/2021 | Shen | |
| 2022/0005154 A1* | 1/2022 | Xu | G06T 7/13 |
| 2022/0215639 A1 | 7/2022 | Hu et al. | |

FOREIGN PATENT DOCUMENTS

| | | |
|---|---|---|
| CN | 109064506 A | 12/2018 |
| CN | 107918753 B | 2/2019 |
| CN | 109635052 A | 4/2019 |
| CN | 109725330 A | 5/2019 |
| CN | 109839922 A | 6/2019 |
| CN | 110163065 A | 8/2019 |
| CN | 111144211 A | 5/2020 |
| CN | 110789533 B | 8/2021 |
| EP | 3299763 A1 | 3/2018 |

\* cited by examiner

DATA PRESENTATION METHOD AND TERMINAL DEVICE

CROSS-REFERENCE TO RELATED APPLICATIONS

This is a continuation of International Patent Application No. PCT/CN2020/110135 filed on Aug. 20, 2020, which claims priority to Chinese Patent Application No. 201910916213.1 filed on Sep. 25, 2019. The disclosures of the aforementioned applications are hereby incorporated by reference in their entireties.

TECHNICAL FIELD

This application relates to the field of autonomous driving technologies, and specifically, to a data presentation method and a terminal device.

BACKGROUND

An autonomous automobile is equipped with a sensing system that senses an environment in which the autonomous automobile is located, and information sensed by the sensing system is displayed on a vehicle-mounted terminal.

At present, sensing of an ambient environment during autonomous driving is mainly performed in manners such as using a laser radar, triangulation ranging, structured light, and stereo vision. Using light detection and ranging (LI-DAR) as an example, the laser radar directly obtains three-dimensional surface data of a scanned ground and a scanned object through non-contact active measurement. An impact of an external environment on the laser radar is very small. The laser radar has advantages such as high resolution, a strong anti-interference capability, and high ranging accuracy, can be used to accurately establish a three-dimensional point cloud map of a scene, and can further perform object recognition in the scene, to detect an obstacle. This provides extremely abundant environment information for the sensing system of the autonomous automobile.

The vehicle-mounted terminal processes all information collected by the laser radar, and presents processed information on the vehicle-mounted terminal. This undoubtedly leads to high calculation overheads.

SUMMARY

Embodiments of this application provide a data presentation method, so that point cloud data related to an autonomous driving apparatus can be adaptively presented based on traveling information or/and user requirement information.

A first aspect of this application provides a data presentation method. The method may include: obtaining traveling information of an autonomous driving apparatus and/or requirement information of a user for data presentation; determining, based on the traveling information of the autonomous driving apparatus and/or the requirement information of the user for data presentation, first point cloud data related to the autonomous driving apparatus, and determining a presentation manner of the first point cloud data, where the first point cloud data is data represented in a form of a plurality of points; and presenting the first point cloud data in the presentation manner.

In the first aspect, the obtaining traveling information of an autonomous driving apparatus and/or requirement information of a user for data presentation may be described as obtaining at least one of the traveling information of the autonomous driving apparatus and the requirement information of the user for data presentation. Correspondingly, the determining, based on the traveling information of the autonomous driving apparatus and/or the requirement information of the user for data presentation, first point cloud data related to the autonomous driving apparatus, and determining a presentation manner of the first point cloud data may be described as determining, based on at least one of the traveling information of the autonomous driving apparatus and the requirement information of the user for data presentation, the first point cloud data related to the autonomous driving apparatus, and determining the presentation manner of the first point cloud data. The traveling information of the autonomous driving apparatus and/or the requirement information of the user for data presentation includes three cases: A: the traveling information of the autonomous driving apparatus; B: the requirement information of the user for data presentation; and C: the traveling information of the autonomous driving apparatus and the requirement information of the user for data presentation. If the traveling information of the autonomous driving apparatus is obtained in the obtaining step, the first point cloud data is determined based on the traveling information of the autonomous driving apparatus when the first point cloud data is determined; if the requirement information of the user for data presentation is obtained in the obtaining step, the first point cloud data is determined based on the requirement information of the user for data presentation when the first point cloud data is determined; or if the traveling information of the autonomous driving apparatus and the requirement information of the user for data presentation are obtained in the obtaining step, the first point cloud data is determined based on the traveling information of the autonomous driving apparatus and the requirement information of the user for data presentation when the first point cloud data is determined. Similarly, the determining a presentation manner of the first point cloud data is also performed in this manner. In the first aspect, the point cloud data related to the autonomous driving apparatus can be adaptively presented based on the traveling information and/or the user requirement information, and not all data needs to be presented, so that data processing complexity is reduced.

In a possible implementation of the first aspect, the method may further include: receiving, from a data collection apparatus, first data of the autonomous driving apparatus and first environmental data around the autonomous driving apparatus.

The foregoing step of determining, based on the traveling information of the autonomous driving apparatus and/or the requirement information of the user for data presentation, first point cloud data related to the autonomous driving apparatus may include: filtering the first data and the first environmental data based on the traveling information of the autonomous driving apparatus and/or the requirement information of the user for data presentation, to obtain second data of the autonomous driving apparatus and second environmental data around the autonomous driving apparatus that are to be presented; and converting the second data and the second environmental data into the first point cloud data.

In this possible implementation, the data collection apparatus may be one of or a combination of two or more of a laser radar, a triangulation ranging sensor, a structured light sensor, and a stereo vision sensor. The first data is data of the autonomous driving apparatus. In an example in which the autonomous driving apparatus is an automobile, the first data may be vehicle body data of the automobile, scene data in the automobile, or the like. The first environmental data may be road surface data, data of another vehicle, pedestrian data, building data, or the like around the autonomous driving apparatus. In this possible implementation, collected data is first filtered, so that an amount of data to be converted into point cloud data can be reduced, thereby reducing a calculation amount of data.

In a possible implementation of the first aspect, the method may further include: receiving, from a data collection apparatus, first data of the autonomous driving apparatus and first environmental data around the autonomous driving apparatus.

The foregoing step of determining, based on the traveling information of the autonomous driving apparatus and/or the requirement information of the user for data presentation, first point cloud data related to the autonomous driving apparatus may include: converting the first data and the first environmental data into second point cloud data; and filtering the second point cloud data based on the traveling information of the autonomous driving apparatus and the requirement information of the user for data presentation, to obtain the first point cloud data to be presented.

A difference between this possible implementation and the previous possible implementation lies only in that occasions of point cloud data conversion are different. Refer to the previous possible implementation for understanding of other content.

In a possible implementation of the first aspect, the traveling information includes at least one of the following: a traveling position, a traveling speed, a lane in which the autonomous driving apparatus is located, weather information, or ambient light information.

The requirement information of the user for data presentation includes at least one of the following: a presentation angle of view, an object to be combined during presentation, or an operating instruction.

Information about the presentation manner includes a point cloud density or a combination of the point cloud density and at least one of the following information: a point cloud size, an object that needs to be presented in the point cloud, a point cloud color, or superposed pre-warning information.

In a possible implementation of the first aspect, when the traveling information includes the traveling position, the foregoing step of determining a presentation manner of the first point cloud data may include: determining, based on the traveling position, a scene in which the autonomous driving apparatus is located, where the scene includes a highway, a city street, a suburb, a mountain road, or a desert; and determining the presentation manner of the first point cloud data based on the scene in which the autonomous driving apparatus is located.

Correspondingly, the presenting the first point cloud data in the presentation manner may include: presenting the first point cloud data by using different densities based on the scene in which the autonomous driving apparatus is located, where a point cloud density corresponding to the city street is greater than that corresponding to the highway, the suburb, the mountain road, or the desert.

In this possible implementation, point cloud data presented by using different densities may be referred to as low-density point cloud or high-density point cloud based on the densities. Certainly, this application is not limited to the two types of point cloud. There may be more names for point cloud. The low-density point cloud is relative to the high-density point cloud. A quantity of points in the low-density point cloud is relatively small, and a distance between the points is relatively large, and the low-density point cloud may also be referred to as sparse point cloud. A quantity of points in the high-density point cloud is relatively large, the points are relatively dense, and the high-density point cloud may also be referred to as dense point cloud. When data of different scenes is presented by using point cloud with different densities, data processing complexity can be reduced to the greatest extent when a safety requirement is met.

In a possible implementation of the first aspect, when the traveling information includes the traveling speed, the foregoing step of determining a presentation manner of the first point cloud data may include: determining the presentation manner of the first point cloud data based on the traveling speed of the autonomous driving apparatus.

Correspondingly, the presenting the first point cloud data in the presentation manner may include: presenting the first point cloud data by using a first density when the traveling speed is less than a speed threshold, or presenting the first point cloud data by using a second density when the traveling speed is greater than the speed threshold, where the first density is greater than the second density.

In this possible implementation, there may be one or more speed thresholds. In an example in which there are a plurality of speed thresholds, speed thresholds of a plurality of gears may be set, and point cloud densities corresponding to the speed thresholds of different gears may be different. For example, 30 km/h is a first gear, 50 km/h is a second gear, and 90 km/h is a third gear. When a speed is less than 30 km/h, the point cloud data is presented by using a relatively high density. When the speed is 30 km/h to 50 km/h, the point cloud data is presented by using an intermediate density. When the speed is 50 km/h to 90 km/h, the point cloud data is presented by using a low density. When the speed is greater than 90 km/h, the point cloud data is presented by using a lower density. The densities of the point cloud data corresponding to the foregoing different gears are increasingly small. In this possible implementation, different point cloud presentation manners are used based on different traveling speeds. When safety is ensured and a calculation amount is reduced, vehicle using experience of the user is also improved.

In a possible implementation of the first aspect, when the requirement information of the user for data presentation includes the presentation angle of view, the foregoing step of determining a presentation manner of the first point cloud data may include: determining the presentation manner of the first point cloud data based on the presentation angle of view, where the presentation angle of view includes an angle of view of God or an angle of view of a driver.

Correspondingly, the presenting the first point cloud data in the presentation manner includes: presenting the first point cloud data from the angle of view of God when the presentation angle of view is the angle of view of God; or presenting the first point cloud data from the angle of view of the driver when the presentation angle of view is the angle of view of the driver.

In this possible implementation, the point cloud presentation manner is described based on different angles of view selected by the user. The angle of view of God can display overall information in a more comprehensive manner. The angle of view of the driver can better satisfy intuitive feelings of the driver. Presentation manners of different angles of views are different, and can adapt to different display habits of different users.

In a possible implementation of the first aspect, when the requirement information of the user for data presentation includes the object to be combined during presentation, the foregoing step of determining a presentation manner of the first point cloud data may include: determining the presentation manner of the first point cloud data based on the object to be combined during presentation, where the object to be combined during presentation includes a high-precision map, a head up display (head up display, HUD), or an augmented reality (augmented reality, AR) scene.

Correspondingly, the presenting the first point cloud data in the presentation manner may include: combining the first point cloud data into the high-precision map for presentation when the object to be combined during presentation is the high-precision map; projecting the first point cloud data onto a first region of a windshield of the autonomous driving apparatus for presentation when the object to be combined during presentation is the HUD, where an area of the first region is less than that of the windshield; or projecting the first point cloud data onto the entire windshield of the autonomous driving apparatus for presentation when the object to be combined during presentation is the AR scene.

In this possible implementation, when the point cloud data is presented, presentation may be performed in combination with the high-precision map, the HUD, or the AR scene, to improve flexibility of point cloud presentation.

In a possible implementation of the first aspect, when the requirement information of the user for data presentation includes the operating instruction, the determining a presentation manner of the first point cloud data includes: determining the presentation manner of the first point cloud data according to the operating instruction, where the operating instruction includes steering, lane changing, or reversing, and the presentation manner includes superposing pre-warning information.

Correspondingly, the presenting the first point cloud data in the presentation manner may include: presenting the first point cloud data superposed with the pre-warning information corresponding to the operating instruction.

In this possible implementation, the pre-warning information may be issued by using a color, for example, red, or may be issued by using sound.

In this possible implementation, alarm reminding may be performed in different manners under different operating instructions such as steering, lane changing, or reversing, to improve an assistance function of point cloud presentation for autonomous driving, thereby further improving driving safety.

A second aspect of this application provides a terminal device. The terminal device has functions of implementing the method in any one of the first aspect or the possible implementations of the first aspect. The functions may be implemented by using hardware or by executing corresponding software by hardware. The hardware or software includes one or more modules corresponding to the functions, for example, a receiving unit, a processing unit, and a sending unit.

A third aspect of this application provides a terminal device. The terminal device includes at least one processor, a memory, a communications port, a display, and computer-executable instructions that are stored in the memory and that can be run on the processor. When the computer-executable instructions are executed by the processor, the processor performs the method in the first aspect or in any possible implementation of the first aspect. The terminal device may be a vehicle-mounted device. The vehicle-mounted device may be pre-disposed on a vehicle body, or integrated with the vehicle, or pluggable, or connected to the vehicle body in another manner.

A fourth aspect of this application provides a computer-readable storage medium storing one or more computer-executable instructions. When the computer-executable instructions are executed by a processor, the processor performs the method in any one of the first aspect or the possible implementations of the first aspect.

A fifth aspect of this application provides a computer program product (or referred to as a computer program) storing one or more computer-executable instructions. When the computer-executable instructions are executed by a processor, the processor performs the method in any one of the first aspect or the possible implementations of the first aspect.

A sixth aspect of this application provides a chip system. The chip system includes a processor, configured to support a terminal device in implementing the functions in any one of the first aspect or the possible implementations of the first aspect. In a possible design, the chip system may further include a memory. The memory is configured to store program instructions and data that are necessary for a terminal device. The chip system may be constituted by a chip, or may include a chip and another discrete device.

For technical effects brought by any one of the second aspect to the sixth aspect or the possible implementations of the second aspect to the sixth aspect, refer to technical effects brought by the first aspect or the different possible implementations of the first aspect. Details are not described herein again.

In embodiments of this application, the point cloud data related to the autonomous driving apparatus can be adaptively presented based on the traveling information and/or the user requirement information, and not all data needs to be presented, so that data processing complexity is reduced.

DESCRIPTION OF EMBODIMENTS

The following describes technical solutions in embodiments of this application with reference to the accompanying drawings in the embodiments of this application. It is clearly that the described embodiments are merely a part rather than all of the embodiments of this application. A person of ordinary skill in the art may learn that the technical solutions provided in embodiments of this application are also applicable to a similar technical problem as a technology evolves and a new scenario emerges.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

An embodiment of this application provides a data presentation method, so that point cloud data related to a vehicle can be adaptively presented based on traveling information or/and user requirement information, and a calculation amount is reduced. Details are separately described in the following.

With development of Internet and positioning technologies, autonomous driving technologies are also developed rapidly. An autonomous driving apparatus may be referred to as an intelligent apparatus. For example, an autonomous vehicle is also referred to as an intelligent automobile. The intelligent automobile may implement autonomous driving based on the internet of vehicles (IOV or IoV). The IoV is a dynamic mobile communications system in which vehicles interact with vehicles, roads, people, sensing devices, and the like, to implement communication between vehicles and public networks. In the internet of vehicles, information may be shared through interconnection of vehicle-to-vehicle, vehicle-to-pedestrian, and vehicle-to-road, and information about vehicles, roads, and environments is collected. In addition, information collected from a plurality of sources is processed, calculated, shared, and securely published on an information network platform, vehicles are effectively guided and monitored based on different functional requirements, and professional multimedia and mobile Internet application services are provided.

Figure 1:
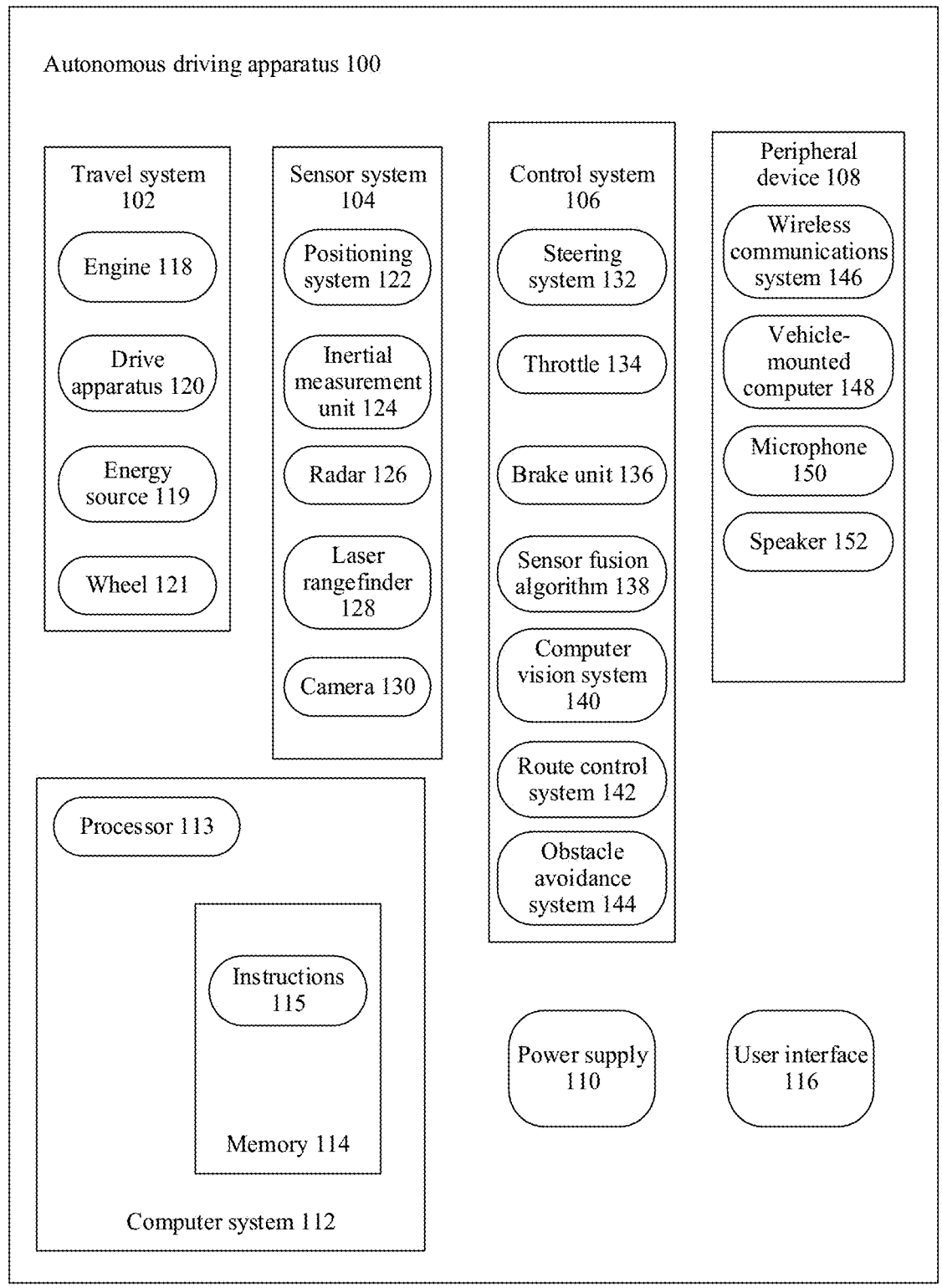
FIG. 1 is a functional block diagram of an autonomous driving apparatus with an autonomous driving function according to an embodiment of this application.
Figure 2:
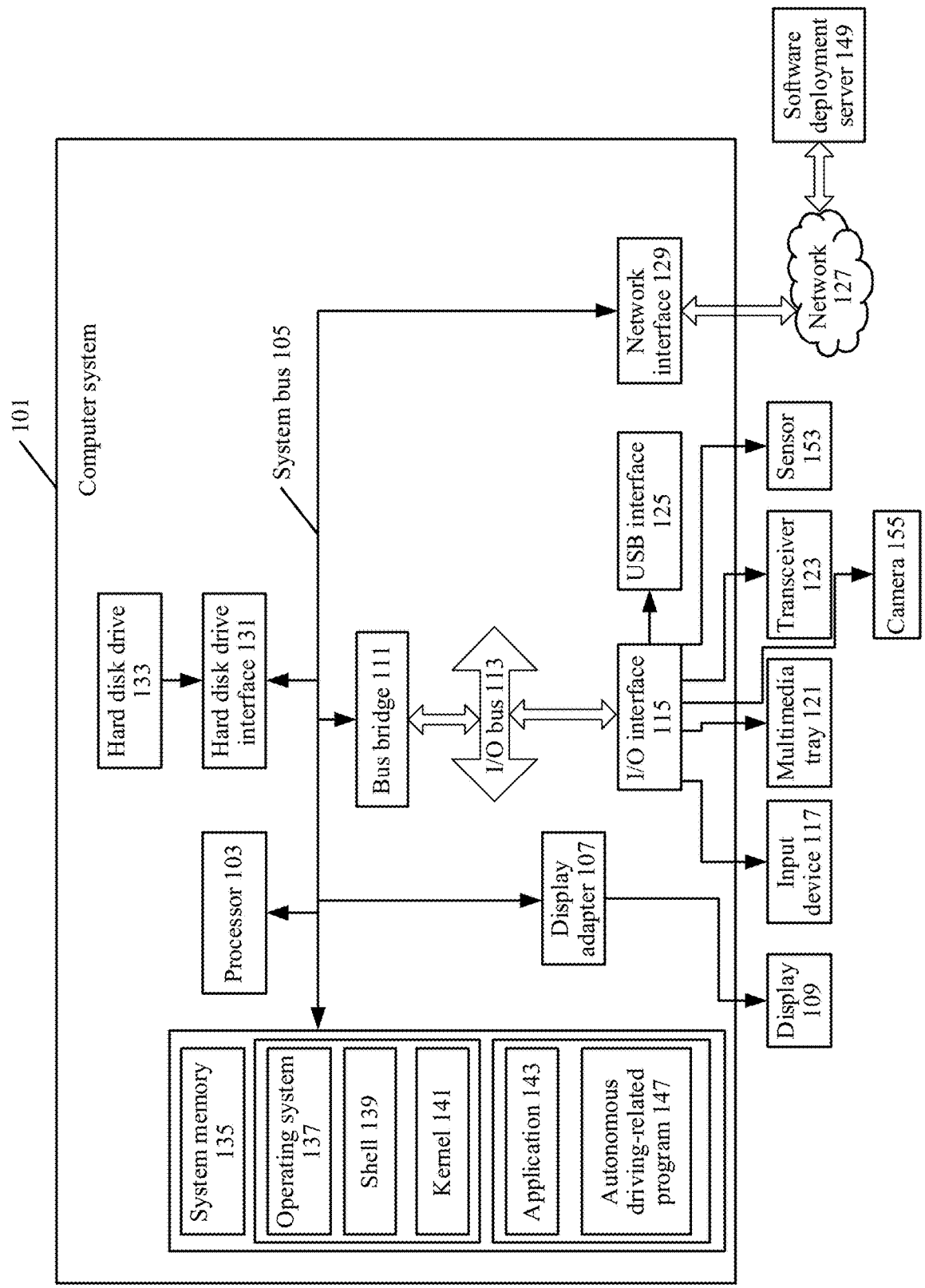
FIG. 2 is a schematic diagram of a structure of an autonomous driving system according to an embodiment of this application.

The following describes the autonomous driving apparatus with reference to FIG. 1 and FIG. 2.

FIG. 1 is a functional block diagram of an autonomous driving apparatus 100 with an autonomous driving function according to an embodiment of this application. In an embodiment, the autonomous driving apparatus 100 is configured to be in a full or partial autonomous driving mode. For example, the autonomous driving apparatus 100 may control itself while being in an autonomous driving mode, and may determine, through a human operation, current states of the autonomous driving apparatus and an ambient environment of the autonomous driving apparatus, determine a possible behavior of at least one of other autonomous driving apparatus in the ambient environment, and determine a confidence level corresponding to a probability that the another autonomous driving apparatus performs the possible behavior, and the autonomous driving apparatus 100 is controlled based on the determined information. When the autonomous driving apparatus 100 is in the autonomous driving mode, it may be set that the autonomous driving apparatus 100 may operate in a case of not interacting with a person.

The autonomous driving apparatus 100 may include various subsystems, for example, a travel system 102, a sensor system 104, a control system 106, one or more peripheral devices 108, a power supply 110, a computer system 112, and a user interface 116. Optionally, the autonomous driving apparatus 100 may include more or fewer subsystems, and each subsystem may include a plurality of elements. In addition, the subsystems and the elements of the autonomous driving apparatus 100 may be all interconnected in a wired or wireless manner.

The travel system 102 may include components that power the autonomous driving apparatus 100. In an embodiment, the travel system 102 may include an engine 118, an energy source 119, a drive apparatus 120, and a wheel/tire 121. The engine 118 may be a combination of an internal combustion engine, an electric motor, an air compression engine, or another type of engine, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may further provide energy for another system of the autonomous driving apparatus 100.

The drive apparatus 120 may transmit mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that sense information about an ambient environment of the autonomous driving apparatus 100. For example, the sensor system 104 may include a positioning system 122 (the positioning system may be a Global Positioning System (GPS), or may be a Beidou system or another positioning system), an inertial measurement unit (IMU) 124, radar 126, a laser rangefinder 128, and a camera 130. The sensor system 104 may further include a sensor that monitors an internal system of the autonomous driving apparatus 100 (for example, an in-vehicle air quality monitor, a fuel gauge, or an oil temperature gauge). Sensor data from one or more of these sensors can be used to detect an object and corresponding features (a position, a shape, a direction, a velocity, and the like) of the object. Detection and recognition are key functions for implementing a secure operation by the autonomous driving apparatus 100.

The positioning system 122 can be configured to estimate a geographical position of the autonomous driving apparatus 100. The IMU 124 is configured to sense a position and an orientation change of the autonomous driving apparatus 100 based on an inertial acceleration. In an embodiment, the IMU 124 may be a combination of an accelerometer and a gyroscope.

The radar 126 may sense an object in the ambient environment of the autonomous driving apparatus 100 by using a radio signal. In some embodiments, in addition to sensing the object, the radar 126 may be further configured to sense a velocity and/or a moving direction of the object.

The laser rangefinder 128 may use a laser to sense an object in an environment in which the autonomous driving apparatus 100 is located. In some embodiments, the laser rangefinder 128 may include one or more laser sources, a laser scanner, one or more detectors, and another system component.

The camera 130 can be configured to capture a plurality of images of the ambient environment of the autonomous driving apparatus 100. The camera 130 may be a static camera or a video camera.

The control system 106 controls operations of the autonomous driving apparatus 100 and components of the autonomous driving apparatus 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 is operable to adjust a forward direction of the autonomous driving apparatus 100. For example, in an embodiment, the steering system may be a steering wheel system.

The throttle 134 is configured to control an operating speed of the engine 118 and further control a speed of the autonomous driving apparatus 100.

The brake unit 136 is configured to control the autonomous driving apparatus 100 to decelerate. The brake unit 136 may use friction to reduce a rotational velocity of the wheel 121. In another embodiment, the brake unit 136 may convert kinetic energy of the wheel 121 into a current. The brake unit 136 may alternatively use another form to reduce a rotational speed of the wheel 121, so as to control the speed of the autonomous driving apparatus 100.

The computer vision system 140 may operate to process and analyze an image captured by the camera 130, so as to recognize objects and/or features in the ambient environment of the autonomous driving apparatus 100. The objects and/or features may include traffic signals, road boundaries, and obstacles. The computer vision system 140 may use an object recognition algorithm, a structure from motion (structure from motion, SFM) algorithm, video tracking, and other computer vision technologies. In some embodiments, the computer vision system 140 may be configured to: draw a map for an environment, track an object, estimate an object velocity, and the like.

The route control system 142 is configured to determine a driving route of the autonomous driving apparatus 100. In some embodiments, the route control system 142 may determine a travel route for the autonomous driving apparatus 100 with reference to data from the sensor fusion algorithm 138, the positioning system 122, and one or more predetermined maps.

The obstacle avoidance system 144 is configured to identify, evaluate, and avoid, or cross, in another manner, a potential obstacle in the environment of the autonomous driving apparatus 100.

Certainly, for example, the control system 106 may add or alternatively include components in addition to those shown and described, or may delete some of the components shown above.

The autonomous driving apparatus 100 interacts with an external sensor, another autonomous driving apparatus, another computer system, or a user through the peripheral device 108. The peripheral device 108 may include a wireless communications system 146, a vehicle-mounted computer 148, a microphone 150, and/or a speaker 152.

In some embodiments, the peripheral device 108 provides a means for a user of the autonomous driving apparatus 100 to interact with the user interface 116. For example, the vehicle-mounted computer 148 may provide information for the user of the autonomous driving apparatus 100. The user interface 116 may further operate the vehicle-mounted computer 148 to receive an input of the user. The vehicle-mounted computer 148 may perform operations through a touchscreen. In other cases, the peripheral device 108 may provide a means used by the autonomous driving apparatus 100 to communicate with another device located in a vehicle. For example, the microphone 150 may receive audio (for example, a voice command or another audio input) from the user of the autonomous driving apparatus 100. Likewise, the speaker 152 may output audio to the user of the autonomous driving apparatus 100.

The wireless communications system 146 may communicate wirelessly with one or more devices directly or through a communications network. For example, the wireless communications system 146 may use 3G cellular communication such as code-division multiple access (CDMA), EVD0, or a Global System for Mobile Communications (GSM)/General Packet Radio Service (GPRS), or 4G cellular communication such as Long-Term Evolution (LTE), or 5G cellular communication. The wireless communications system 146 may communicate with a wireless local area network (WLAN) by using Wi-Fi. In some embodiments, the wireless communications system 146 may directly communicate with a device through an infrared link, Bluetooth, or ZigBee. Other wireless protocols include, for example, various autonomous driving apparatus communications systems. For example, the wireless communications system 146 may include one or more dedicated short range communications (DSRC) devices, and these devices may include an autonomous driving apparatus and/or a roadside station that perform public and/or private data communication.

The power supply 110 may supply power to the components of the autonomous driving apparatus 100. In an embodiment, the power supply 110 may be a rechargeable lithium-ion or lead-acid battery. One or more battery packs of such a battery may be configured as a power supply to supply power to the components of the autonomous driving apparatus 100. In some embodiments, the power supply 110 and the energy source 119 may be implemented together, for example, in some pure electric vehicles.

Some or all functions of the autonomous driving apparatus 100 are controlled by the computer system 112. The computer system 112 may include at least one processor 113. The processor 113 executes instructions 115 stored in a non-transitory computer-readable medium such as a memory 114. The computer system 112 may alternatively be a plurality of computing devices that control individual components or subsystems of the autonomous driving apparatus 100 in a distributed manner.

The processor 113 may be any conventional processor, such as a commercially available central processing unit (CPU). Alternatively, the processor may be a dedicated device such as an application-specific integrated circuit (ASIC) or another hardware-based processor. Although FIG. 1 functionally illustrates the processor, the memory, and other elements of a computer in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In the aspects described herein, the processor may be located far away from the autonomous driving apparatus and perform wireless communication with the autonomous driving apparatus. In other aspects, some of the processes described herein are performed on the processor disposed inside the autonomous driving apparatus, while others are performed by a remote processor. The processes include necessary steps for performing a single operation.

In some embodiments, the memory 114 may include the instructions 115 (for example, program logics), and the instructions 115 may be executed by the processor 113 to perform various functions of the autonomous driving apparatus 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instructions 115, the memory 114 may further store data such as a road map, route information, a position, a direction, and a speed of the autonomous driving apparatus, and other such autonomous driving apparatus data, and other information. Such information may be used by the autonomous driving apparatus 100 and the computer system 112 when the autonomous driving apparatus 100 operates in an autonomous mode, a semi-autonomous mode, and/or a manual mode.

The user interface 116 is configured to provide information for or receive information from the user of the autonomous driving apparatus 100. Optionally, the user interface 116 may include one or more input/output devices within a set of peripheral devices 108, such as the wireless communications system 146, the vehicle-mounted computer 148, the microphone 150, and the speaker 152.

The computer system 112 may control functions of the autonomous driving apparatus 100 based on an input received from each of the subsystems (for example, the travel system 102, the sensor system 104, and the control system 106) and from the user interface 116. For example, the computer system 112 may use an input from the control system 106 to control the steering system 132 to avoid an obstacle detected by the sensor system 104 and the obstacle avoidance system 144. In some embodiments, the computer system 112 is operable to provide control over many aspects of the autonomous driving apparatus 100 and the subsystems of the autonomous driving apparatus 100.

Optionally, one or more of the foregoing components may be installed separately from or associated with the autonomous driving apparatus 100. For example, the memory 114 may be partially or completely separated from the autonomous driving apparatus 100. The foregoing components may be communicatively coupled together in a wired and/or wireless manner.

Optionally, the foregoing components are merely examples. During actual application, components in the foregoing modules may be added or deleted based on an actual requirement. FIG. 1 should not be understood as a limitation on the embodiments of this application.

An autonomous driving vehicle traveling on a road, such as the foregoing autonomous driving apparatus 100, may recognize an object in an ambient environment of the autonomous driving apparatus 100 to determine adjustment on a current speed. The object may be another autonomous driving apparatus, a traffic control device, or another type of object. In some examples, each recognized object may be considered independently, and a speed to be adjusted to by an autonomous driving vehicle may be determined based on features of the object, such as a current speed of the object, an acceleration of the object, and a distance between the object and the autonomous driving apparatus.

Optionally, the autonomous driving apparatus 100 or computing devices (for example, the computer system 112, the computer vision system 140, and the memory 114 in FIG. 1) associated with the autonomous driving apparatus 100 may predict a behavior of an identified object based on features of the identified object and a state of the ambient environment (for example, traffic, rain, or ice on roads). Optionally, all the identified objects depend on behavior of each other, and therefore all the identified objects may be considered together to predict behavior of a single identified object. The autonomous driving apparatus 100 can adjust the speed of the autonomous driving apparatus 100 based on the predicted behavior of the recognized object. In other words, the autonomous driving vehicle can determine, based on the predicted action of the object, a specific stable state (for example, acceleration, deceleration, or stop) to which the autonomous driving apparatus needs to be adjusted. In this process, another factor may also be considered to determine the speed of the autonomous driving apparatus 100, for example, a horizontal position of the autonomous driving apparatus 100 on a road on which the autonomous driving apparatus 100 travels, a curvature of the road, and proximity between a static object and a dynamic object.

In addition to providing an instruction for adjusting the speed of the autonomous driving vehicle, the computing device may further provide an instruction for modifying a steering angle of the autonomous driving apparatus 100, so that the autonomous driving vehicle can follow a given track and/or maintain safe horizontal and vertical distances from objects (for example, a vehicle on a neighboring lane of the road) near the autonomous driving vehicle.

The autonomous driving apparatus 100 may be a vehicle, a truck, a motorcycle, a bus, a boat, an airplane, a helicopter, a lawnmower, a recreational vehicle, an autonomous driving apparatus for a playground, a construction device, a tram, a golf cart, a train, a handcart, or the like. This is not specifically limited in this embodiment of this application.

FIG. 1 is the functional block diagram of the autonomous driving apparatus 100. The following describes an autonomous driving system in the autonomous driving apparatus 100. FIG. 2 is a schematic diagram of a structure of the autonomous driving system according to an embodiment of this application. FIG. 1 and FIG. 2 show the autonomous driving apparatus 100 from different perspectives. For example, a computer system 101 in FIG. 2 is the computer system 112 in FIG. 1.

As shown in FIG. 2, the computer system 101 includes a processor 103, and the processor 103 is coupled to a system bus 105. The processor 103 may be one or more processors, and each processor may include one or more processor cores. A display adapter (video adapter) 107 may drive a display 109, and the display 109 is coupled to the system bus 105. The system bus 105 is coupled to an input/output (I/O) bus 113 by using a bus bridge 111. An I/O interface 115 is coupled to the I/O bus. The I/O interface 115 communicates with a plurality of types of I/O devices, such as an input device 117 (for example, a keyboard, a mouse, or a touchscreen), and a multimedia tray 121, for example, a CD-ROM or a multimedia interface. A transceiver 123 (which may send and/or receive a radio communication signal), a camera 155 (which may capture static and dynamic digital video images), and an external USB interface 125 are provided. Optionally, an interface connected to the I/O interface 115 may be a USB interface.

The processor 103 may be any conventional processor, including a reduced instruction set computing (RISC) processor, a complex instruction set computing (CISC) processor, or a combination thereof. Optionally, the processor may be a dedicated apparatus such as an ASIC. Optionally, the processor 103 may be a neural-network processing unit (NPU), or a combination of a neural-network processing unit and the foregoing conventional processor. Optionally, a neural-network processing unit is disposed on the processor 103.

The computer system 101 may communicate with a software deployment server 149 through a network interface 129. The network interface 129 is a hardware network interface, such as a network adapter. A network 127 may be an external network, such as the Internet; or may be an internal network, such as the Ethernet or a virtual private network (VPN). Optionally, the network 127 may alternatively be a wireless network, for example, a Wi-Fi network or a cellular network.

A hard disk drive interface is coupled to the system bus 105. The hardware drive interface is connected to a hard disk drive. A system memory 135 is coupled to the system bus 105. Data running in the system memory 135 may include an operating system 137 and an application 143 of the computer system 101.

The operating system includes a shell 139 and a kernel 141. The shell 139 is an interface between a user and the kernel of the operating system. The shell 139 is the outermost layer of the operating system. The shell 139 manages interaction between the user and the operating system: waiting for an input of the user, explaining the input of the user to the operating system, and processing output results of various operating systems.

The kernel 141 includes those parts of the operating system that are used for managing memories, files, peripherals, and system resources. The kernel directly interacts with hardware. The kernel of the operating system usually runs processes and provides inter-process communication, CPU time slice management, interruption, memory management, I/O management, and the like.

The application 143 includes an autonomous driving-related program, for example, a program for managing interaction between an autonomous driving apparatus and an obstacle on a road, a program for controlling a driving route or speed of an autonomous driving apparatus, or a program for controlling interaction between an autonomous driving apparatus 100 and another autonomous driving apparatus on the road. The application 143 may be on a system of the software deployment server (deployment server) 149. In an embodiment, when the application 143 needs to be executed, the computer system 101 may download the application 143 from the software deployment server 149.

A sensor 153 is associated with the computer system 101. The sensor 153 is configured to detect an ambient environment of the computer system 101. For example, the sensor 153 may detect an animal, a vehicle, an obstacle, a pedestrian crosswalk, and the like. Further, the sensor may detect an environment around the foregoing object such as the animal, the vehicle, the obstacle, and the pedestrian crosswalk, for example, an environment around the animal, such as another animal appearing around the animal, a weather condition, and brightness of the ambient environment. Optionally, if the computer system 101 is located on the autonomous driving apparatus, the sensor may be a camera, an infrared sensor, a chemical detector, a microphone, or the like. When being activated, the sensor 153 senses information at preset intervals, and provides the sensed information for the computer system 101 in real time or near real time.

The computer system 101 is configured to: determine a driving status of the autonomous driving apparatus 100 based on sensor data collected by the sensor 153; determine, based on the driving status and a current driving task, a driving operation that needs to be executed by the autonomous driving apparatus 100; and send, to the control system 106 (which is shown in FIG. 1), a control instruction corresponding to the driving operation. The driving status of the autonomous driving apparatus 100 may include a driving situation of the autonomous driving apparatus 100, for example, a head direction, a speed, a location, and an acceleration, and may also include a status of the ambient environment of the autonomous driving apparatus 100, for example, a location of an obstacle, a location and a speed of another vehicle, a location of a pedestrian crosswalk, or a signal of a traffic light. The computer system 101 may include a task abstraction network and a shared policy network that are implemented by the processor 103. Specifically, the processor 103 determines a current autonomous driving task. The processor 103 inputs at least one group of historical paths of the autonomous driving task to the task abstraction network for feature extraction, to obtain a task feature vector representing features of the autonomous driving task. The processor 103 determines, based on the sensor data collected by the sensor 153, a status vector representing a current driving status of the autonomous driving apparatus. The processor 103 inputs the task feature vector and the status vector into the shared policy network for processing, to obtain a driving operation that needs to be performed currently by the autonomous driving apparatus. The processor 103 performs the driving operation through the control system. The processor 103 repeats the foregoing steps of determining and performing the driving operation, until the autonomous driving task is completed.

Optionally, in the embodiments described in this specification, the computer system 101 may be located far away from the autonomous driving apparatus, and may perform wireless communication with the autonomous driving apparatus. The transceiver 123 may send an autonomous driving task, the sensor data collected by the sensor 153, and other data to the computer system 101, and may further receive a control instruction sent by the computer system 101. The autonomous driving apparatus may execute the control instruction received by the transceiver from the computer system 101, and perform a corresponding driving operation. In another aspect, some of processes described herein are performed on a processor disposed in the autonomous driving vehicle, and others are performed by a remote processor, including taking an action required to perform a single manipulation.

Figure 3:
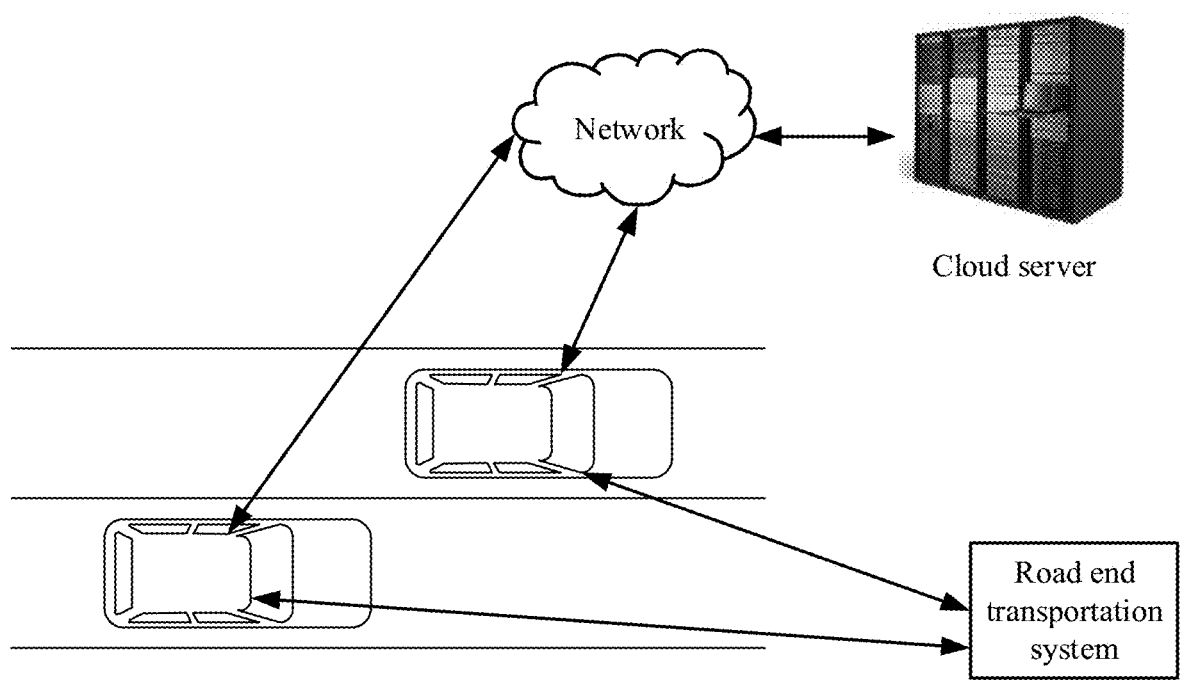
FIG. 3 is a schematic diagram of an embodiment of an autonomous driving system according to an embodiment of this application.

In an autonomous driving process of the autonomous driving apparatus, there is a process of processing a large amount of data. The data processing process usually needs to be completed by a cloud server. In the autonomous driving process, traveling needs to be performed with reference to an indication of a device in a road end transportation system. It can be learned that the autonomous driving apparatus can only implement autonomous driving by relying on the autonomous driving system shown in FIG. 3. For example, in the autonomous driving system shown in FIG. 3, the cloud server communicates with an autonomous vehicle by using a network, and the autonomous vehicle communicates with the road end transportation system. In the autonomous driving process, a data collection apparatus on the autonomous vehicle collects ambient environment information (for example, red light information in road end traffic information and information about other vehicles around) and information about the vehicle itself, and reports the information to the cloud server, and after processing the reported data, the cloud server sends traveling indication information to the autonomous vehicle.

Figure 4:
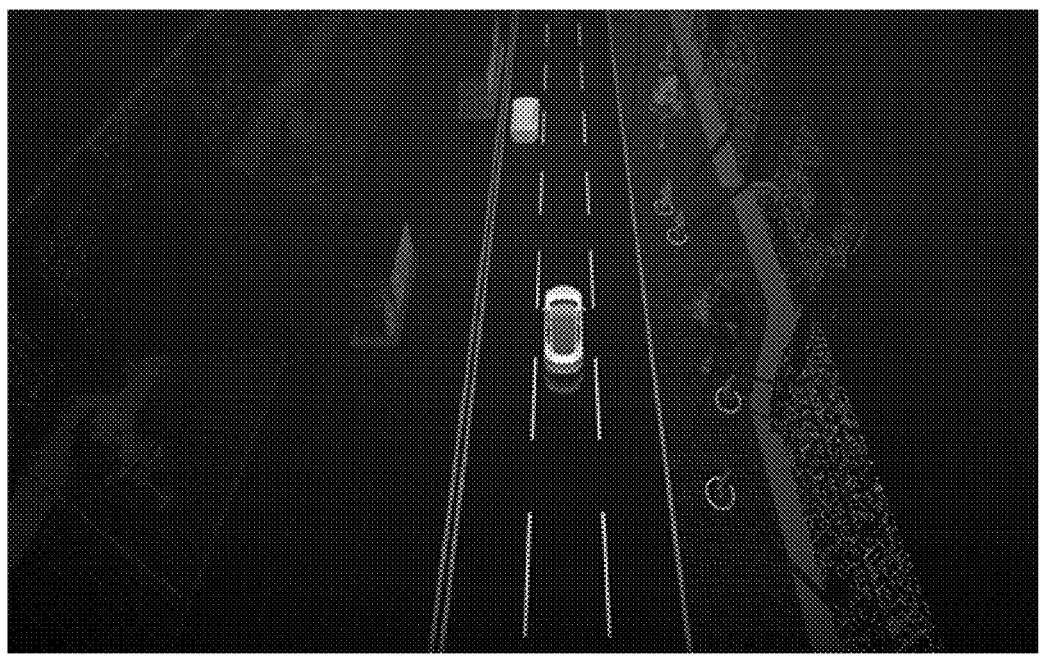
FIG. 4 is a diagram of an interface in which point cloud data is presented according to an embodiment of this application.

To ensure safety of autonomous driving, the autonomous driving apparatus may also present a status of the ambient environment of the autonomous driving apparatus to a user by using a human-computer interaction interface. An embodiment of this application provides a data presentation method, so that point cloud data related to an autonomous driving apparatus can be adaptively presented based on traveling information or/and user requirement information. For an example of point cloud data presented in an autonomous driving process of an autonomous vehicle, refer to FIG. 4 for understanding. A device configured to present the point cloud data may be a terminal device on the autonomous driving apparatus, for example, a vehicle-mounted terminal on an automobile, or an on-board terminal on an airplane.

Figure 5:
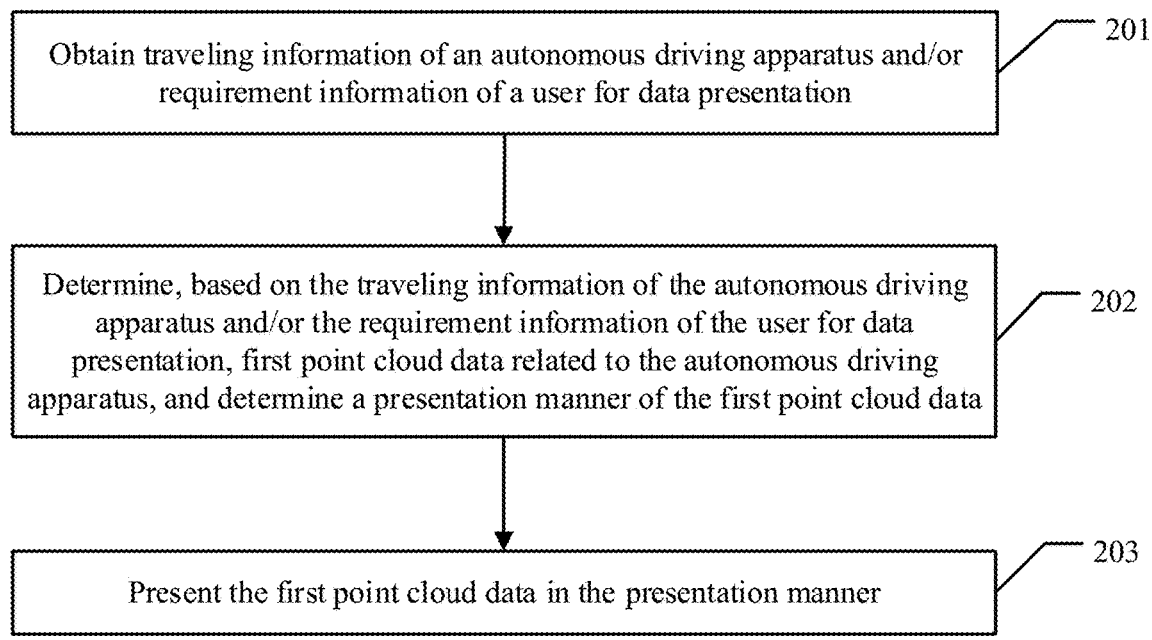
FIG. 5 is a schematic diagram of an embodiment of a data presentation method according to an embodiment of this application.

As shown in FIG. 5, an embodiment of a data presentation method according to an embodiment of this application may include:

201: Obtain traveling information of an autonomous driving apparatus and/or requirement information of a user for data presentation.

The traveling information of the autonomous driving apparatus may include at least one of the following: a traveling position, a traveling speed, a lane in which the autonomous driving apparatus is located, weather information, or ambient light information.

The requirement information of the user for data presentation may include at least one of the following: a presentation angle of view, an object to be combined during presentation, or an operating instruction.

202: Determine, based on the traveling information of the autonomous driving apparatus and/or the requirement information of the user for data presentation, first point cloud data related to the autonomous driving apparatus, and determine a presentation manner of the first point cloud data.

The first point cloud data is data represented in a form of a plurality of points.

Information about the presentation manner includes a point cloud density or a combination of the point cloud density and at least one of the following information: a point cloud size, an object that needs to be presented in the point cloud, a point cloud color, or superposed pre-warning information.

203: Present the first point cloud data in the presentation manner.

In this embodiment of this application, during autonomous driving, the autonomous driving apparatus adaptively presents the corresponding point cloud data based on the traveling information and/or the requirement information of the user for data presentation, and does not present all detected data, so that data processing complexity and data presentation complexity are reduced.

Before or after step 201, the method further includes: receiving, from a data collection apparatus, first data of the autonomous driving apparatus and first environmental data around the autonomous driving apparatus.

The data collection apparatus may be one of or a combination of two or more of a laser radar, a triangulation ranging sensor, a structured light sensor, and a stereo vision sensor.

The laser radar calculates a distance from a sensor a target surface by emitting laser pulse and measuring a laser transmission time. A distance on which the laser radar acts may reach several kilometers. Typical laser radars include scanning laser radars and planar array laser radars.

The triangulation ranging sensor emits a laser beam to a surface of an object by using a laser emitter, and uses a camera to record a position of a flare. Three-dimensional coordinates of the flare on the surface of the object can be obtained by solving a triangle formed by the laser emitter, the flare, and the camera.

The structured light sensor projects a flare with a fixed mode onto the surface of the object, and measures a deformation of the flare mode to solve position information of a surface point.

The stereo vision sensor uses two or more cameras to obtain two-dimensional images of the same object, and solves spatial coordinates of a target object corresponding to the two-dimensional images by finding corresponding points between two images.

The first data is data of the autonomous driving apparatus. In an example in which the autonomous driving apparatus is an automobile, the first data may be vehicle body data of the automobile, scene data in the automobile, or the like. The first environmental data may be road surface data, data of another vehicle, pedestrian data, building data, or the like around the autonomous driving apparatus.

In this embodiment of this application, filtering is performed with reference to the traveling information of the autonomous driving apparatus and/or the requirement information of the user for data presentation. The filtering may be performed before the collected data is converted into cloud data. Alternatively, filtering may be performed after the collected data is all converted into cloud data. The following provides description separately.

1. Filtering is performed before the collected data is converted into the cloud data.

Step 202 may include the following steps: filtering the first data and the first environmental data based on the traveling information of the autonomous driving apparatus and/or the requirement information of the user for data presentation, to obtain second data of the autonomous driving apparatus and second environmental data around the autonomous driving apparatus that are to be presented; and converting the second data and the second environmental data into the first point cloud data.

In this embodiment, the collected data is first filtered, so that a data volume of data to be converted into the point cloud data can be reduced, thereby reducing a calculation amount of data.

2. Filtering is performed after the collected data is all converted into the cloud data.

Step 202 may include the following steps: converting the first data and the first environmental data into second point cloud data; and filtering the second point cloud data based on the traveling information of the autonomous driving apparatus and the requirement information of the user for data presentation, to obtain the first point cloud data to be presented.

Either in the foregoing manner of performing filtering first or in the foregoing manner of performing filtering later, point cloud conversion processes are the same. The following describes the process of converting the collected data into the point cloud data.

Figure 6:
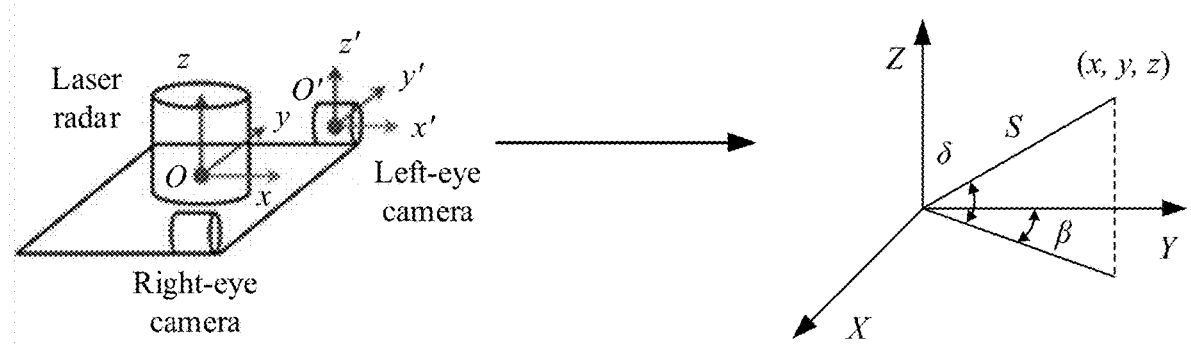
FIG. 6 is a schematic diagram of data conversion of a laser radar according to an embodiment of this application.

Using the laser radar as an example, a laser coordinate system is shown in FIG. 6. The X-axis passes through a center point of the laser radar and points to the due front, the Y-axis passes through the center point and is horizontally perpendicular to the X-axis along a plane of the laser radar, and the Z-axis passes through the center point and is perpendicular to a plane formed by the X-axis and the Y-axis. Through laser radar processing, information, for example, a distance S from each laser point to a corresponding laser, a horizontal direction angle δ, a vertical direction angle β, and reflection intensity are directly obtained. Based on the angles δ and β, and the distance S, a coordinate (x, y, z) of each laser point can be calculated, to complete conversion from one piece of collected data to one piece of point cloud data.

In this embodiment of this application, the presentation manner of the first point cloud data may be determined by using the traveling information, or may be determined by using the requirement information of the user for data presentation when the presentation manner of the first point cloud data is determined. The following provides description separately.

1. When the traveling information includes the traveling position, the determining a presentation manner of the first point cloud data may include: determining, based on the driving position, a scene in which the autonomous driving apparatus is located, where the scene includes a highway, a city street, a suburb, a mountain road, or a desert; and determining the presentation manner of the first point cloud data based on the scene in which the autonomous driving apparatus is located.

Correspondingly, the presenting the first point cloud data in the presentation manner may include: presenting the first point cloud data by using different densities based on the scene in which the autonomous driving apparatus is located, where a point cloud density corresponding to the city street is greater than that corresponding to the highway, the suburb, the mountain road, or the desert.

In this embodiment, in an example in which the autonomous driving apparatus is an autonomous vehicle, a scene in which the autonomous vehicle is located may be determined by combining the traveling position and a positioning technology. In this way, different presentations may be performed with reference to different scenes. Point cloud data presented by using different densities may be referred to as low-density point cloud or high-density point cloud based on the densities. Certainly, this application is not limited to the two types of point cloud. There may be more names for point cloud.

Figure 7:
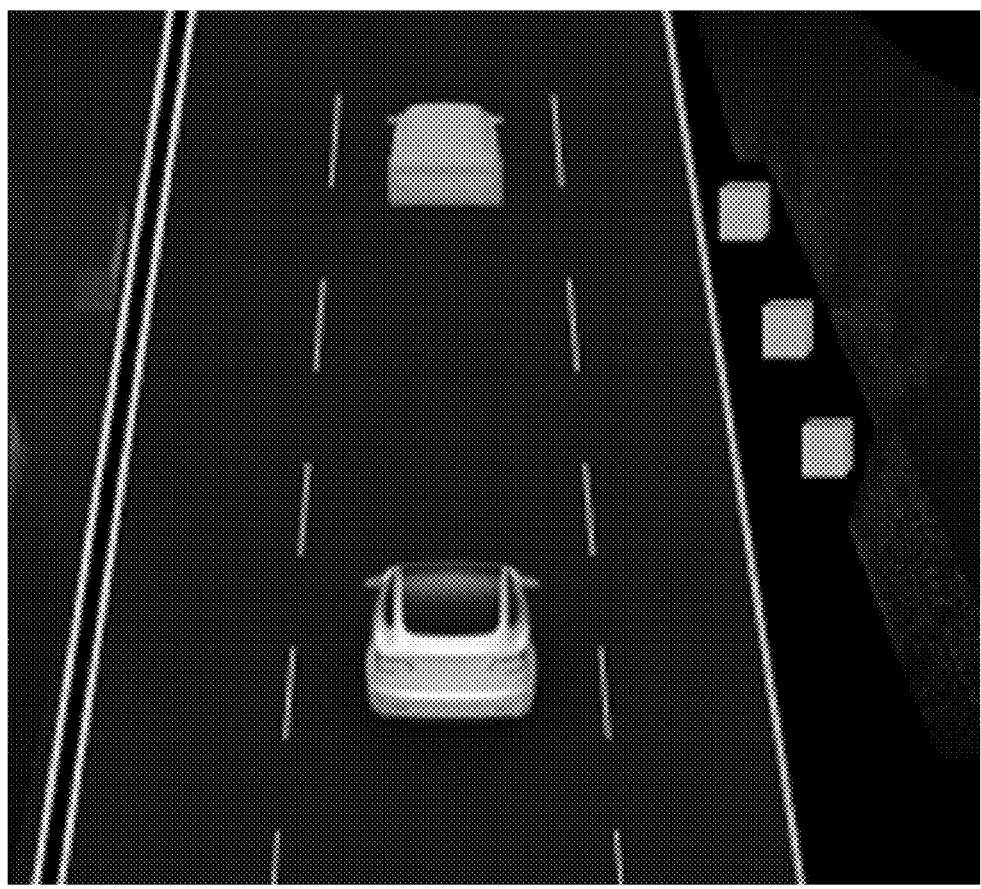
FIG. 7 is a diagram of another interface in which point cloud data is presented according to an embodiment of this application.

For example, in a highway scenario, because a route is relatively fixed and usually, there is no pedestrian shuttling on a highway, the information is mainly about vehicles and lanes, and buildings and trees on both sides of the highway do not affect driving. Therefore, a scenery on both sides of the highway does not need to be accurately displayed. To reduce complexity of collecting ambient information by a vehicle traveling at a high speed, other vehicle information may also be presented by using low-density point cloud. A presentation form of the low-density point cloud may be understood with reference to FIG. 7.

Figure 8:
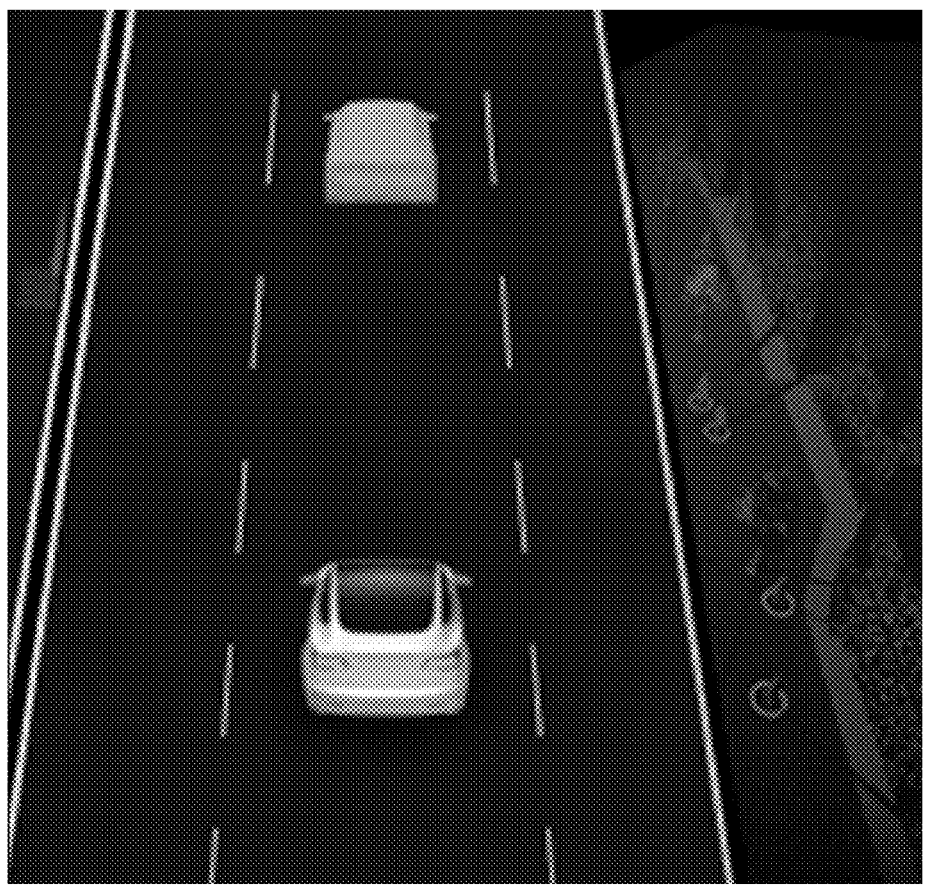
FIG. 8 is a diagram of another interface in which point cloud data is presented according to an embodiment of this application.

In an urban street, especially a traffic congestion scenario in an urban city, some moving pedestrians related to the vehicle need to be presented due to pedestrian shuttle. In addition, in this scenario, more detailed information is more beneficial to driving safety. Therefore, presentation may be performed by using high-density point cloud. The presentation form of the high-density point cloud may be understood with reference to FIG. 8.

The low-density point cloud is relative to the high-density point cloud. A quantity of points in the low-density point cloud is relatively small, and a distance between the points is also relatively large, and the low-density point cloud may also be referred to as sparse point cloud. A quantity of points in the high-density point cloud is relatively large, the points are relatively dense, and the high-density point cloud may also be referred to as dense point cloud.

In other scenarios, for example, in a scenario of a suburb, a mountain road, or a desert, refer to the highway scenario. Point cloud data of each scenario is presented by using low-density point cloud. In view of this, in this embodiment, when point cloud data of different scenes is presented by using point cloud with different densities, data processing complexity can be reduced to the greatest extent when a security requirement is met.

2. When the traveling information includes the traveling speed, the determining a presentation manner of the first point cloud data may include: determining the presentation manner of the first point cloud data based on the traveling speed of the autonomous driving apparatus.

Correspondingly, the presenting the first point cloud data in the presentation manner may include: presenting the first point cloud data by using a first density when the traveling speed is less than a speed threshold, or presenting the first point cloud data by using a second density when the traveling speed is greater than the speed threshold, where the first density is greater than the second density.

Figure 9A:
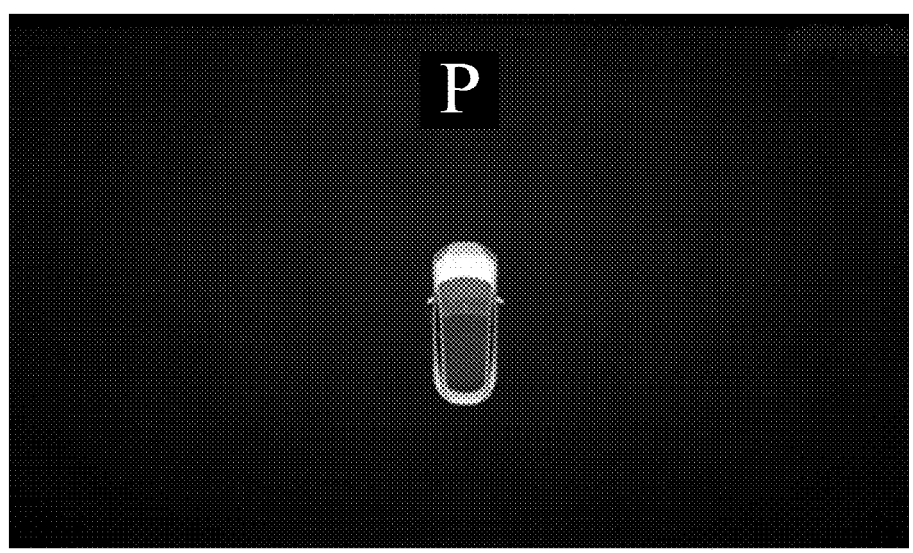
FIG. 9A to FIG. 9C are respectively diagrams of other interfaces in which point cloud data is presented according to an embodiment of this application.
Figure 9B:
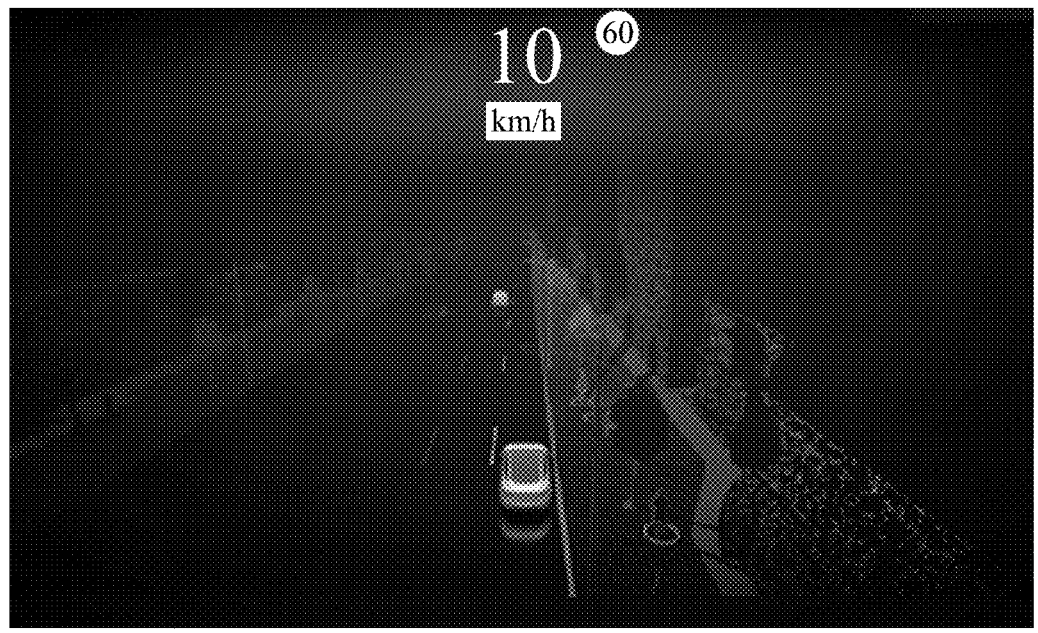
Figure 9C:
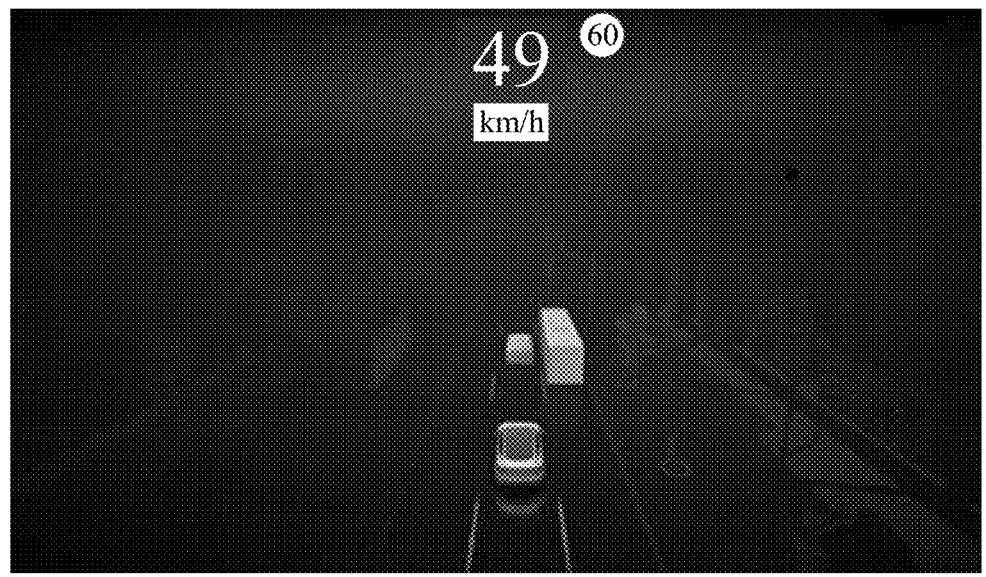

In this embodiment, at a vehicle startup stage, because the vehicle has not started traveling, there is no need for a safety prompt. Therefore, the point cloud information may not be presented, as shown in FIG. 9A. As the vehicle accelerates after startup, the point cloud data starts to present. When a traveling speed is relatively low, the vehicle moves less quickly, a calculation amount involved in autonomous traveling of the vehicle is small, and accurate display of the ambient situation does not affect safety. However, when the speed is relatively high, because the vehicle moves relatively quickly, a calculation amount involved in autonomous traveling of the vehicle is relatively large. If the ambient situation is accurately displayed, safety may be affected. Therefore, if the speed is below a speed threshold, for example, the speed threshold is 30 km/h, as shown in FIG. 9B, when the traveling speed is below 30 km/h, high-density point cloud is used to present ambient things and a dynamic situation. When the traveling speed is increasingly high, as shown in FIG. 9C, is greater than 30 km/h, the low-density point cloud may be used to present the ambient things and the dynamic situation.

Certainly, it is not limited herein that there is only one speed threshold. Speed thresholds of a plurality of gears may be set, and point cloud densities corresponding to the speed thresholds of different gears may be different. For example, 30 km/h is a first gear, 50 km/h is a second gear, and 90 km/h is a third gear. When a speed is less than 30 km/h, the point cloud data is presented by using a relatively high density. When the speed is 30 km/h to 50 km/h, the point cloud data is presented by using an intermediate density. When the speed is 50 km/h to 90 km/h, the point cloud data is presented by using a low density. When the speed is greater than 90 km/h, the point cloud data is presented by using a lower density. The densities of the point cloud data corresponding to the foregoing different gears are increasingly small.

In this embodiment, different point cloud presentation manners are used based on different traveling speeds. When safety is ensured and a calculation amount is reduced, vehicle using experience of the user is also improved.

3. When the requirement information of the user for data presentation includes the presentation angle of view, the determining a presentation manner of the first point cloud data may include: determining the presentation manner of the first point cloud data based on the presentation angle of view, where the presentation angle of view includes an angle of view of God or an angle of view of a driver.

Correspondingly, the presenting the first point cloud data in the presentation manner may include: presenting the first point cloud data from the angle of view of God when the presentation angle of view is the angle of view of God; or presenting the first point cloud data from the angle of view of the driver when the presentation angle of view is the angle of view of the driver.

Figure 10:
FIG. 10 is a schematic diagram of an interface from an angle of view of a driver according to an embodiment of this application.

In this embodiment, the point cloud presentation manner is described based on different angles of view selected by the user. FIG. 9A to FIG. 9C all show presentation manners provided from an angle of view of God. The angle of view of God can display overall information in a more comprehensive manner. In actual life, some users are more adapted to presentation from an angle of view of a driver. FIG. 10 shows point cloud data presented from the angle of view of the driver.

In this embodiment of this application, presentation manners of different angles of views are different, and can adapt to different display habits of different users.

4. When the requirement information of the user for data presentation includes the object to be combined during presentation, the determining a presentation manner of the first point cloud data may include: determining the presentation manner of the first point cloud data based on the object to be combined during presentation, where the object to be combined during presentation includes a high-precision map, a head up display (HUD), or an augmented reality (AR) scene.

Correspondingly, the presenting the first point cloud data in the presentation manner may include: combining the first point cloud data into the high-precision map for presentation when the object to be combined during presentation is the high-precision map; projecting the first point cloud data onto a first region of a windshield of the autonomous driving apparatus for presentation when the object to be combined during presentation is the HUD, where an area of the first region is less than that of the windshield; or projecting the first point cloud data onto the entire windshield of the autonomous driving apparatus for presentation when the object to be combined during presentation is the AR scene.

In this embodiment, when the point cloud data is presented, presentation may be performed in combination with the high-precision map, the HUD, or the AR scene, to improve flexibility of point cloud presentation.

5. When the requirement information of the user for data presentation includes the operating instruction, the determining a presentation manner of the first point cloud data may include: determining the presentation manner of the first point cloud data according to the operating instruction, where the operating instruction includes steering, lane changing, or reversing, and the presentation manner includes superposing pre-warning information.

Correspondingly, the presenting the first point cloud data in the presentation manner may include: presenting the first point cloud data superposed with the pre-warning information corresponding to the operating instruction.

In this embodiment, the pre-warning information may be issued by using a color, for example, red, or may be issued by using sound.

Figure 11:
FIG. 11 is a diagram of another interface in which point cloud data is presented according to an embodiment of this application.

In a traveling process of a vehicle, lane changing may be required. During lane changing, related pre-warning information may be presented, based on a traveling speed of the current vehicle and traveling speeds of a previous vehicle and a following vehicle on a target lane, for the vehicle that needs to perform lane changing. For example, as shown in FIG. 11, when the traveling speed of the following vehicle on the target lane is relatively high and conflicts with a lane changing speed of the vehicle that performs lane changing, pre-warning point cloud information is presented on a side corresponding to the current vehicle. The pre-warning point cloud information may be presented by using point cloud with a color, for example, red, or may be presented by using pre-warning prompt point cloud with a flash reminding function.

Figure 12:
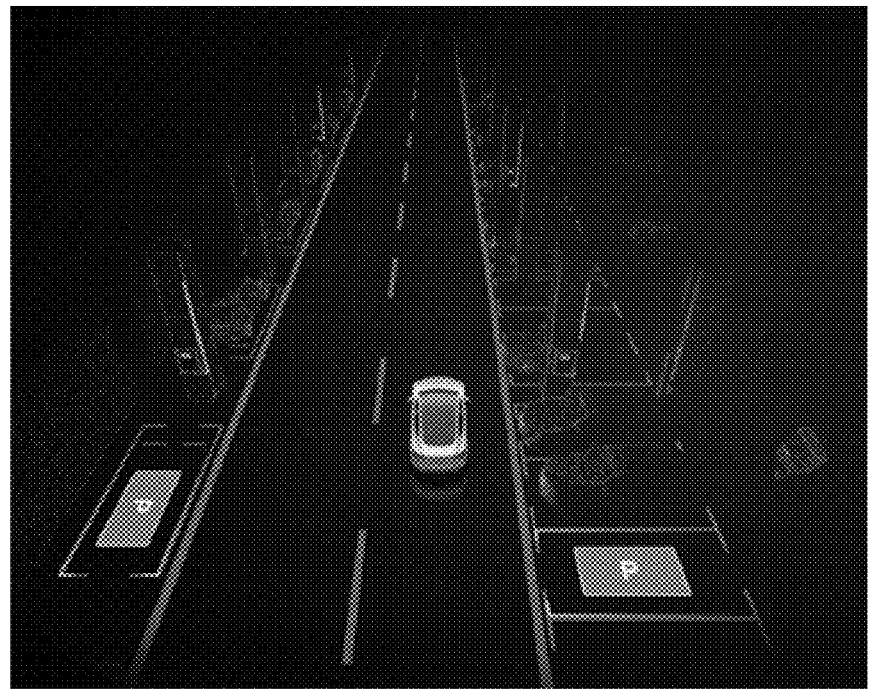
FIG. 12 is a diagram of another interface in which point cloud data is presented according to an embodiment of this application.

A pre-warning prompt in a parking scenario is as follows: In a process in which the autonomous vehicle reverses, when a thing sensed within a range affected by reversing of the vehicle is presented, a dangerous thing is presented by using point cloud with reference to a reversing speed and a reversing angle of the current autonomous vehicle, to perform a reminding function. As shown in FIG. 12, in the parking scenario, information about an available parking lot is displayed.

The method for presenting pre-warning information by using point cloud provided in this embodiment of this application improves an assistance function of point cloud presentation on autonomous driving, and further improves driving safety.

In this embodiment of this application, determining and presentation of point cloud data are described separately with reference to aspects such as the traveling position, the traveling speed, the presentation angle of view, the object to be combined during presentation, and the operating instruction. It should be noted that, the traveling position, the traveling speed, the presentation angle of view, the object to be combined during presentation, and the operating instruction may be combined to determine the point cloud data and the presentation manner. In addition, the traveling information of another autonomous driving apparatus and/or the requirement information of the user for data presentation may also be separately used, or used in combination with the foregoing traveling position, traveling speed, presentation angle of view, object to be combined during presentation, and operating instruction, to determine the point cloud data and the presentation manner. This is not listed one by one in this embodiment of this application.

In this embodiment of this application, a presentation mechanism of point cloud is adapted based on different requirements of the user and traveling conditions, so that the user can adapt to presented content of an external environment in different scenarios. Point cloud can implement a key assistance function in a scenario in which a visual capability of the user is weak. Therefore, point cloud plays an important role in intelligent driving.

The point cloud data presentation method provided in this embodiment of this application may not only be applied to the field of autonomous driving, but also be applied to scenarios that need to be presented, such as a safe city, safety protection, and old and disabled people assistance in which target identification and obstacle detection need to be performed.

The foregoing describes the data presentation method. The following describes, with reference to accompanying drawings, a terminal device provided in an embodiment of this application.

Figure 13:
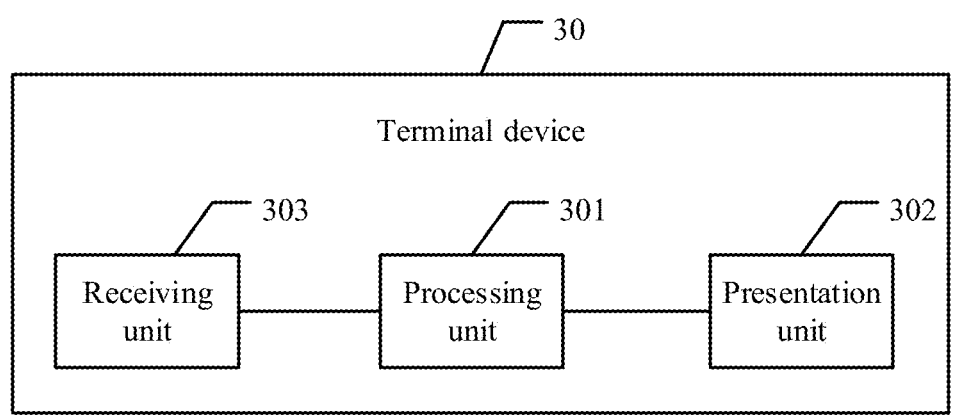
FIG. 13 is a schematic diagram of an embodiment of a terminal device according to an embodiment of this application.

As shown in FIG. 13, an embodiment of the terminal device 30 provided in this embodiment of this application may include: a processing unit 301, configured to: obtain traveling information of an autonomous driving apparatus and/or requirement information of a user for data presentation, determine, based on the traveling information of the autonomous driving apparatus and/or the requirement information of the user for data presentation, first point cloud data related to the autonomous driving apparatus, and determine a presentation manner of the first point cloud data, where the first point cloud data is data represented in a form of a plurality of points; and a presentation unit 302, configured to present the first point cloud data in the presentation manner.

In this embodiment of this application, during autonomous driving, the autonomous driving apparatus adaptively presents the corresponding point cloud data based on the traveling information and/or the requirement information of the user for data presentation, and does not present all detected data, so that data processing complexity and data presentation complexity are reduced.

In an optional embodiment, a receiving unit 303 is configured to receive, from a data collection apparatus, first data of the autonomous driving apparatus and first environmental data around the autonomous driving apparatus.

The processing unit 301 is configured to: filter the first data and the first environmental data based on the traveling information of the autonomous driving apparatus and/or the requirement information of the user for data presentation, to obtain second data of the autonomous driving apparatus and second environmental data around the autonomous driving apparatus that are to be presented; and convert the second data and the second environmental data into the first point cloud data.

In an optional embodiment, the terminal device 30 further includes:

The processing unit 301 is configured to: convert the first data and the first environmental data into second point cloud data; and filter the second point cloud data based on the traveling information of the autonomous driving apparatus and the requirement information of the user for data presentation, to obtain the first point cloud data to be presented.

In an optional embodiment, the traveling information includes at least one of the following: a traveling position, a traveling speed, a lane in which the autonomous driving apparatus is located, weather information, or ambient light information.

The requirement information of the user for data presentation includes at least one of the following: a presentation angle of view, an object to be combined during presentation, or an operating instruction.

Information about the presentation manner includes a point cloud density or a combination of the point cloud density and at least one of the following information: a point cloud size, an object that needs to be presented in the point cloud, a point cloud color, or superposed pre-warning information.

In an optional embodiment, when the traveling information includes the traveling position, the processing unit 301 is configured to: determine, based on the traveling position, a scene in which the autonomous driving apparatus is located, where the scene includes a highway, a city street, a suburb, a mountain road, or a desert; and determine the presentation manner of the first point cloud data based on the scene in which the autonomous driving apparatus is located; and the presentation unit 302 is configured to present the first point cloud data by using different densities based on the scene in which the autonomous driving apparatus is located, where a point cloud density corresponding to the city street is greater than that corresponding to the highway, the suburb, the mountain road, or the desert.

In an optional embodiment, when the traveling information includes the traveling speed, the processing unit 301 is configured to determine the presentation manner of the first point cloud data based on the traveling speed of the autonomous driving apparatus; and the presentation unit 302 is configured to present the first point cloud data by using a first density when the traveling speed is less than a speed threshold, or present the first point cloud data by using a second density when the traveling speed is greater than the speed threshold, where the first density is greater than the second density.

In an optional embodiment, when the requirement information of the user for data presentation includes the presentation angle of view, the processing unit 301 is configured to determine the presentation manner of the first point cloud data based on the presentation angle of view, where the presentation angle of view includes an angle of view of God or an angle of view of a driver; and the presentation unit 302 is configured to: present the first point cloud data from the angle of view of God when the presentation angle of view is the angle of view of God; or present the first point cloud data from the angle of view of the driver when the presentation angle of view is the angle of view of the driver.

In an optional embodiment, when the requirement information of the user for data presentation includes the object to be combined during presentation, the processing unit 301 is configured to determine the presentation manner of the first point cloud data based on the object to be combined during presentation, where the object to be combined during presentation includes a high-precision map, a head up display HUD, or an augmented reality AR scene; and the presentation unit 302 is configured to: combine the first point cloud data into the high-precision map for presentation when the object to be combined during presentation is the high-precision map; project the first point cloud data onto a first region of a windshield of the autonomous driving apparatus for presentation when the object to be combined during presentation is the HUD, where an area of the first region is less than that of the windshield; or project the first point cloud data onto the entire windshield of the autonomous driving apparatus for presentation when the object to be combined during presentation is the AR scene.

In an optional embodiment, the processing unit 301 is configured to determine the presentation manner of the first point cloud data according to the operating instruction, where the operating instruction includes steering, lane changing, or reversing, and the presentation manner includes superposing pre-warning information; and the presentation unit 302 is configured to present the first point cloud data superposed with the pre-warning information corresponding to the operating instruction.

It should be noted that, because content such as information exchange between modules of the terminal device 30 and an execution process are based on a same concept as that of the method embodiment of this application, technical effects brought by the content are the same as those in the disclosed method embodiment. For specific content, refer to descriptions in the foregoing method embodiment shown in this application. Details are not described herein again.

Figure 14:
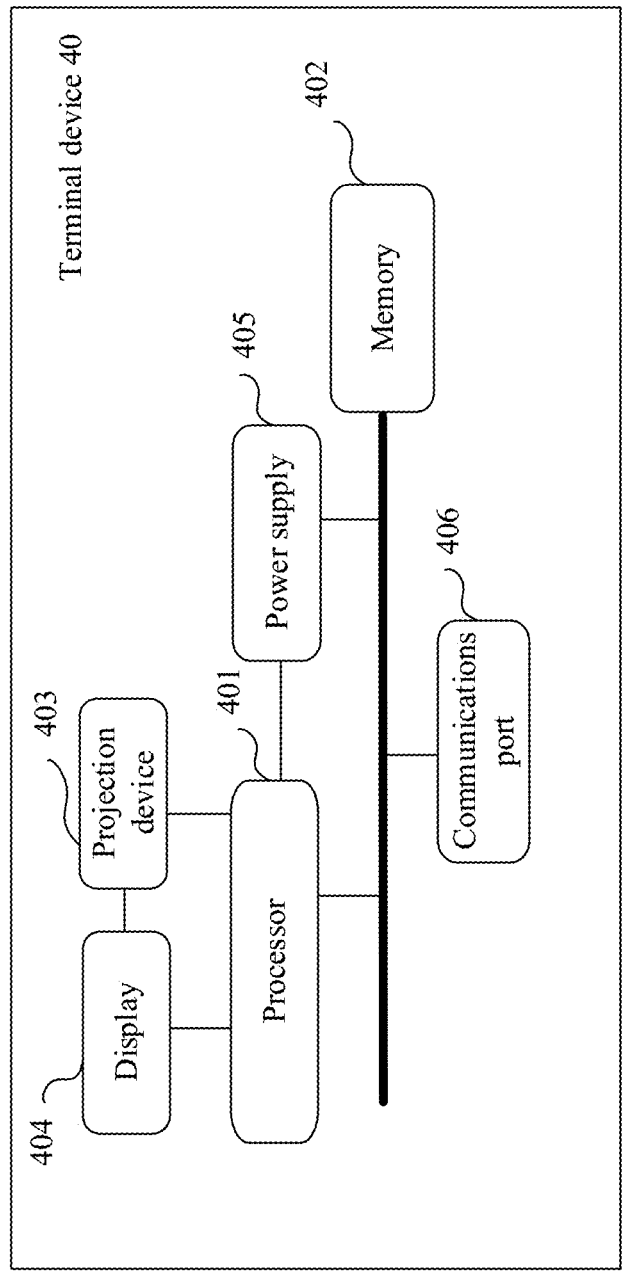
FIG. 14 is a schematic diagram of another embodiment of a terminal device according to an embodiment of this application.

FIG. 14 is a schematic diagram of a structure of another device according to an embodiment of this application. The device is a terminal device 40, and the terminal device 40 may include a processor 401 (for example, a CPU), a memory 402, a display 404, and a projection device 403. The display 404 and the projection device 403 are coupled to the processor 401, and the processor 401 controls a sending action of the display 404 and a receiving action of the projection device 403. The memory 402 may include a high-speed RAM memory, or may further include a non-volatile memory (NVM), for example, at least one magnetic disk memory. The memory 402 may store various instructions, to complete various processing functions and implement the method steps in the embodiments of this application. Optionally, the terminal device in this embodiment of this application may further include one or more of a power supply 405 and a communications port 406. The devices described in FIG. 14 may be connected by using a communications bus, or may be connected in another connection manner. This is not limited in this embodiment of this application. The communications bus is configured to implement communication connections between components. The communications port 406 is configured to implement connection and communication between the terminal device and other peripherals.

In some embodiments, the processor 401 in the terminal device may perform an action performed by the processing unit 301 in FIG. 13, the communications port 406 in the terminal device may perform an action performed by the receiving unit 303 in FIG. 13, and the display 404 and the projection device 403 in the terminal device may perform actions performed by the presentation unit 302 in FIG. 13. Implementation principles and technical effects thereof are similar, and details are not described herein again.

This application further provides a chip system. The chip system includes a processor, configured to support the foregoing terminal device in implementing a function related to the terminal device, for example, receiving or processing data in the foregoing method embodiments. In a possible design, the chip system further includes a memory, and the memory is configured to store program instructions and data that are necessary for a terminal device. The chip system may be constituted by a chip, or may include a chip and another discrete device.

In another embodiment of this application, a computer-readable storage medium is further provided. The computer-readable storage medium stores computer-executable instructions. When at least one processor of a device executes the computer-executable instructions, the device performs the methods described in the embodiments of FIG. 5 to FIG. 12.

Another embodiment of this application further provides a computer program product. The computer program product includes computer-executable instructions, and the computer-executable instructions are stored in a computer-readable storage medium. At least one processor of a device may read the computer-executable instructions from the computer-readable storage medium. When the at least one processor executes the computer-executable instructions, the device performs the methods described in the embodiments in FIG. 5 to FIG. 12.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in the embodiments of this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in various embodiments of the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in the embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in various embodiments of the embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A method implemented by one or more processors, comprising:
   obtaining traveling information of an autonomous driving apparatus or requirement information of a user for data presentation;
   receiving, from a data collection apparatus, first data of the autonomous driving apparatus and first environmental data regarding an environment around the autonomous driving apparatus;
   determining first point cloud data related to the autonomous driving apparatus, wherein the first point cloud data is data represented in a form of a plurality of points, and wherein the first point cloud data is related with the traveling information or the requirement information;
   determining a presentation manner of the first point cloud data based on the traveling information or the requirement information, wherein the traveling information comprises weather information and comprises a traveling position, a traveling speed, a lane in which the autonomous driving apparatus is located, or ambient light information, wherein the requirement information comprises a presentation angle of view, a first object to be combined during presentation, or an operating instruction, and wherein the presentation manner corresponds to a point cloud density or a combination of the point cloud density and a point cloud size, a second object that needs to be presented in a first point cloud, a point cloud color, or superposed pre-warning information; and
   presenting the first point cloud data in the presentation manner by:
      projecting the first point cloud data onto a first region of a windshield of the autonomous driving apparatus when the first object is a head-up display (HUD), wherein an area of the first region is less than that of the windshield; and
      projecting the first point cloud data onto an entirety of the windshield when the first object is an augmented reality (AR) scene.

2. The method of claim 1, wherein the traveling information comprises the traveling position, and wherein the method further comprises:
   determining, based on the traveling position, a scene in which the autonomous driving apparatus is located, wherein the scene comprises a highway, a city street, a suburb, a mountain road, or a desert;
   further determining the presentation manner based on the scene; and
   further presenting the first point cloud data using different densities based on the scene, wherein a first point cloud density corresponding to the city street is greater than second point cloud densities corresponding to the highway, the suburb, the mountain road, or the desert.

3. The method of claim 1, wherein the traveling information comprises the traveling speed, and wherein the method further comprises:
   further determining the presentation manner based on the traveling speed; and
   further presenting the first point cloud data using a first density when the traveling speed is less than a speed threshold or using a second density when the traveling speed is greater than or equal to the speed threshold, wherein the first density is greater than the second density.

4. The method of claim 1, wherein the requirement information comprises the presentation angle of view, and wherein the method further comprises:
   further determining the presentation manner based on the presentation angle of view, wherein the presentation angle of view comprises a first angle of a bird's eye view or a second angle of view of a driver; and
   further presenting the first point cloud data from the first angle of view when the presentation angle of view is the first angle of view or from the second angle of view when the presentation angle of view is the second angle of view.

5. The method of claim 1, wherein the requirement information comprises the first object, wherein the method further comprises further determining the presentation manner based on the first object, wherein the first object comprises a high-precision map, and wherein presenting the first point cloud data combining the first point cloud data into the high-precision map for presentation when the first object is the high-precision map.

6. The method of claim 1, wherein the requirement information comprises the operating instruction, and wherein the method further comprises:
   further determining the presentation manner according to the operating instruction, wherein the operating instruction comprises steering, lane changing, or reversing, and wherein the presentation manner comprises superposing pre-warning information; and
   further presenting the first point cloud data superposed with the pre-warning information corresponding to the operating instruction.

7. A terminal device, comprising:
   a communications port configured to receive, from a data collection apparatus, first data of an autonomous driving apparatus and first environmental data regarding an environment around the autonomous driving apparatus;
   one or more processors coupled to the communications port and configured to:
      obtain traveling information of the autonomous driving apparatus or requirement information of a user for data presentation;
      determine first point cloud data related to the autonomous driving apparatus, wherein the first point cloud data is data represented in a form of a plurality of points, and wherein the first point cloud data is related with the traveling information or the requirement information; and
      determine a presentation manner of the first point cloud data based on the traveling information or the requirement information, wherein the traveling information comprises weather information and comprises a traveling position, a traveling speed, a lane in which the autonomous driving apparatus is located, or ambient light information, wherein the requirement information comprises a presentation angle of view, a first object to be combined during presentation, or an operating instruction, and wherein the presentation manner corresponds to point cloud density or a combination of the point cloud density and a point cloud size, a second object that needs to be presented in a first point cloud, a point cloud color, or superposed pre-warning information;

a display coupled to the one or more processors and configured to present the first point cloud data in the presentation manner; and a projection device coupled to the one or more processors and configured to:
project the first point cloud data onto a first region of a windshield of the autonomous driving apparatus when the first object is a head-up display (HUD), wherein an area of the first region is less than that of the windshield; and
project the first point cloud data onto an entirety of the windshield when the first object an augmented reality (AR) scene.

8. The terminal device of claim 7, wherein the traveling information comprises the traveling position, and wherein the one or more processors are further configured to:
determine, based on the traveling position, a scene in which the autonomous driving apparatus is located, wherein the scene comprises a highway, a city street, a suburb, a mountain road, or a desert; and
further determine the presentation manner based on the scene,
wherein the display is further configured to further present the first point cloud data using different densities based on the scene, and
wherein a first point cloud density corresponding to the city street is greater than or equal to second point cloud densities corresponding to the highway, the suburb, the mountain road, or the desert.

9. The terminal device of claim 7, wherein the traveling information comprises the traveling speed, wherein the one or more processors are further configured to further determine the presentation manner based on the traveling speed, wherein the display is further configured to further present the first point cloud data using a first density when the traveling speed is less than a speed threshold or using a second density when the traveling speed is greater than or equal to the speed threshold, and wherein the first density is greater than or equal to the second density.

10. The terminal device of claim 7, wherein the requirement information comprises the presentation angle of view, wherein the one or more processors are further configured to further determine the presentation manner based on the presentation angle of view, wherein the presentation angle of view comprises a first angle of a bird's eye view or a second angle of view of a driver, and wherein the display is further configured to:
further present the first point cloud data from the first angle of view when the presentation angle of view is the first angle of view; or
further present the first point cloud data from the second angle of view when the presentation angle of view is the second angle of view.

11. The terminal device of claim 7, wherein the requirement information comprises the first object, wherein the one or more processors are further configured to further determine the presentation manner based on the first object, wherein the first object comprises a high-precision map and wherein the display is further configured to combine the first point cloud data into the high-precision map for presentation when the first object is the high-precision map.

12. The terminal device of claim 7, wherein the requirement information comprises the operating instruction, wherein the operating instruction comprises steering, lane changing, or reversing, wherein the one or more processors are further configured to further determine the presentation manner according to the operating instruction, wherein the presentation manner comprises superposing pre-warning information, and wherein the display is configured to further present the first point cloud data superposed with the pre-warning information corresponding to the operating instruction.

13. An autonomous driving apparatus, comprising:
a communications port configured to collect first data of the autonomous driving apparatus and first environmental data regarding an environment around the autonomous driving apparatus; and
one or more processors of a terminal device coupled to the communications port and configured to:
obtain traveling information of the autonomous driving apparatus or requirement information of a user for data presentation;
determine, using the first data, the first environmental data, and the traveling information or the requirement information, first point cloud data related to the autonomous driving apparatus, wherein the first point cloud data is data represented in a form of a plurality of points;
determine a presentation manner of the first point cloud data, wherein the traveling information comprises weather information and comprises a traveling position, a traveling speed, a lane in which the autonomous driving apparatus is located, or ambient light information, wherein the requirement information comprises a presentation angle of view, a first object to be combined during presentation, or an operating instruction, and wherein the presentation manner corresponds to point cloud density or a combination of the point cloud density and a point cloud size, a second object that needs to be presented in a first point cloud, a point cloud color, or superposed pre-warning information; and
present the first point cloud data in the presentation manner by:
projecting the first point cloud data onto a first region of a windshield of the autonomous driving apparatus when the first object is a head-up display (HUD), wherein an area of the first region is less than that of the windshield; and
projecting the first point cloud data onto an entirety of the windshield for presentation when the first object is an augmented reality (AR) scene.

14. The method of claim 1, wherein the superposed pre-warning information includes a color or a sound.

15. The autonomous driving apparatus of claim 13, wherein the superposed pre-warning information includes a color.

16. The autonomous driving apparatus of claim 13, wherein the superposed pre-warning information includes a sound.

17. The autonomous driving apparatus of claim 13, wherein the operating instruction comprises steering, lane changing, or reversing.

18. The autonomous driving apparatus of claim 13, wherein to determine the first point cloud data, the terminal device is further configured to:
- use a first process of filtering the first data and the first environmental data based on the traveling information or the requirement information to obtain second data of the autonomous driving apparatus and second environmental data regarding the environment that are to-be-presented and to reduce an amount of the second data that is to-be-converted into first point cloud data, and converting the second data and the second environmental data into the first point cloud data; or
- use a second process of converting the first data and the first environmental data into second point cloud data, and filtering the second point cloud data based on the traveling information or the requirement information to obtain the first point cloud data and to reduce an amount of the second data that is to-be-presented.

19. The autonomous driving apparatus of claim 13, wherein the first object comprises a high-precision map.

20. The autonomous driving apparatus of claim 13, wherein the presentation angle of view comprises a first angle of a bird's eye view or a second angle of view of a driver.

\* \* \* \* \*